United States Patent
Chaudhari et al.

(10) Patent No.: US 6,954,247 B2
(45) Date of Patent: Oct. 11, 2005

(54) MULTI-DOMAIN LOW TWIST ANGLE LIQUID CRYSTAL CELLS AND METHODS OF PRODUCTION THEREOF

(75) Inventors: Praveen Chaudhari, Briarcliff Manor, NY (US); James P. Doyle, Bronx, NY (US); Eileen A. Galligan, Fishkill, NY (US); James A. Lacey, Mahopac, NY (US); Shui-Chih Lien, Briarcliff Manor, NY (US); Minhua Lu, Mohegan, NY (US); Hiroki Nakano, Shiga (JP); Kei-Hsiung Yang, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/982,585

(22) Filed: Nov. 5, 2004

(65) Prior Publication Data

US 2005/0062920 A1 Mar. 24, 2005

Related U.S. Application Data

(62) Division of application No. 10/059,969, filed on Jan. 28, 2002.

(51) Int. Cl.[7] .......................................... G02F 1/1337
(52) U.S. Cl. ..................................... 349/129; 349/124
(58) Field of Search .................................. 349/129, 124

(56) References Cited

U.S. PATENT DOCUMENTS

| | | | |
|---|---|---|---|
| 4,896,947 A | | 1/1990 | Leenhouts |
| 5,249,070 A | | 9/1993 | Takano |
| 5,689,322 A | * | 11/1997 | Hirata et al. ................. 349/180 |
| 5,770,826 A | | 6/1998 | Chaudhari et al. |
| 5,883,687 A | | 3/1999 | Lu et al. |
| 6,061,115 A | * | 5/2000 | Samant et al. ............... 349/129 |
| 6,115,093 A | | 9/2000 | Murai et al. |
| 6,124,914 A | * | 9/2000 | Chaudhari et al. .......... 349/129 |
| 6,611,307 B2 | * | 8/2003 | Nakano ....................... 349/129 |

* cited by examiner

Primary Examiner—James A. Dudek
(74) Attorney, Agent, or Firm—Jose Gutman; Fleit, Kain, Gibbons, Gutman, Bongini & Bianco P.L.

(57) ABSTRACT

Multi-domain liquid crystal cells having twist angles less than 90 degrees, and LCDs containing such liquid crystal cells, are provided. Such liquid crystal cells are stable, particularly at zero and high fields, and provide wide viewing angles. Also provided are methods of using an adjustable particle beam in combination with a mask to generate multi-domains alignments. Such methods are useful for producing liquid crystal cells in general, and for producing the novel multi-domain low twist angle liquid crystal cells of the present invention in particular.

13 Claims, 7 Drawing Sheets

MULTI-DOMAIN LOW TWIST ANGLE LIQUID CRYSTAL CELLS AND METHODS OF PRODUCTION THEREOF

This a Divisional of Application Ser. No. 10/059,969, filed Jan 28, 2002.

BACKGROUND OF THE INVENTION

1. Field of the Invention

This invention generally relates to the field of liquid crystal displays, and more particularly relates to multi-domain low twist angle liquid crystal cells having wide viewing angles and high stability, and methods of producing such liquid crystal cells, particularly methods of generating multi-directional liquid crystal alignments with a particle beam and scanning mask.

2. Description of Related Art

Typical liquid crystal ("LC") cells, or pixels, used in liquid crystal displays ("LCDs") make use of nematic and twisted nematic ("TN") LC phases, although other LC phases, such as cholesteric and smectic, may also be used. LC molecules are widely used in display applications because of their optical and electromagnetic anisotropy. In particular, LC molecules tend to assume an orientation in which the majority of LC molecules are aligned along their long axis in a preferred direction; this preferred direction is referred to as the LC director orientation. Furthermore, LC molecules adjacent to a surface that has been imparted with an alignment direction (or "alignment orientation") will tend to assume a director orientation that is parallel to the alignment direction of the surface. Typically, in TN LC cells, an LC medium is disposed between a pair of substrates, wherein each of the substrates has a different alignment direction; typically, the alignment direction of each of the substrates are perpendicular to each other. This difference in alignment directions forces the LC molecules to form a continuous twist arrangement between the pair of substrates. The angle between the alignments on the opposing substrates, through which the LC molecules twist, is referred to as the twist angle. Furthermore, different regions of at least one of the substrates can be aligned in different directions, thereby creating different alignment domains. Typically, LCD operation is based on the ability of light to pass through the LC cell when the LC molecules are in the twisted arrangement and, by applying a field, such as an electric or magnetic field, to the LC cell, the LC molecules can be forced to un-twist, thereby preventing light from passing through the LC cell.

LC molecules in typical twist nematic liquid crystal displays ("TN LCDs") alter between a planar twist state and a tilted orientation. When the liquid crystal molecules attain the tilted orientation, light from the direction of incidence is subject to various different indexes of reflection. Since the functionality of LCDs is based on the birefringence effect, the transmittance of light will vary with different viewing angles. However, due to such differences in light transmission, optimum viewing of an LCD display is achieved within a limited viewing angle. The limited viewing angle of LCDs is one of the major disadvantages associated with LCDs and is a major factor in restricting the commercial applications for which LCDs could be used.

Several approaches exist for increasing the viewing angles of LCDs, such as in-plane switching ("IPS"), multi-domain vertical alignment, compensation films, and multi-domain TN LC configurations. IPS mode uses comb-like inter-digitized electrodes to apply electrical fields in the plane of the substrates, thereby aligning the liquid crystal molecules along the substrates and providing wide viewing angles for use in wide viewing angle monitors or other applications. However, although IPS provides wide viewing angles, it requires high voltages and has low aperture ratios. In addition, due to the planar electric field structure, IPS mode inherently suffers from severe image sticking. In vertical alignment mode, a multi-domain arrangement is achieved by introducing a protruding structure that forces the liquid crystal molecules to tilt in different directions. However, vertical alignment mode requires an extra photolithography step during fabrication and compensation film is necessary to improve viewing angles.

It is well known in the art that viewing angles of TN LCDs can be improved by dividing each display pixel into two or more LC sub-domains with each sub-domain having a different LC director orientation (i.e., LC alignment direction). Chen et al. (J. Chen, P. J. Bos, J. R. Kelly, *SID '97 DIGEST*, p. 937) has reported the fabrication of four-domain twist nematic ("4D-TN") LC cells and LCDs by reverse rubbing and double oblique evaporation techniques in which each domain of the 4D-TN LC cell having normal twist is surrounded by three domains having reverse twist and vice versa, and the twist angle of each domain is 90 degrees. However, if the pixel size is below about 300 microns, it is difficult to stabilize a 4D-TN LC cell at zero field unless the pre-tilt angle is larger than about 25 degrees or the 4D-TN LC cell is stabilized by a polymer matrix. Such a polymer matrix can be formed by field- and UV-induced polymerization of UV-curable diacrylate monomer added to the nematic LC medium; however, the costs are high for materials and manufacturing of LCDs comprised of such polymer-stabilized 4D-TN LC cells. No LC alignment techniques based on rubbing polyimide films exist that can generate a pre-tilt angle larger than about 15 degrees in order to stabilize a 4D-TN LC cell at either zero or high field. Although LC alignment by oblique evaporation of oxides can achieve a pre-tilt angle larger than about 20 degrees, the technique is prohibitively expensive for use in manufacturing and can't be applied to large substrates.

Processes used in the art for fabricating multi-domain TN LC cells, and LCDs comprised of such LC cells, have typically been based on either polyimide rubbing or UV exposure (photo-alignment). However, the cost of such processes is prohibitively expensive due to the need for multiple photolithographic steps between the rubbing steps in order to produce the desired alignment results. In addition, lithographic procedures introduce contamination in the alignment layers and suffer from reliability problems.

Recently, it has been shown that ion beam irradiation can be used to align surfaces for LCD manufacturing. For example, U.S. Pat. No. 5,770,826 (Chaudhari et al.) describes the use of low energy ion beams to impart an alignment direction to the surface of a wide variety of materials. However, the present method of ion beam irradiation used in the art only allows for the fabrication of single domain displays by one-directional alignment. Multi-domain alignment can be accomplished with ion beam irradiation using the same photolithographic techniques that have been used in rubbing processes, but the cost of such procedures is prohibitively expensive.

Therefore a need exists to overcome the problems with the prior art as discussed above, and particularly for multi-domain LC cells, and LCDs comprised of such LC cells, that provide wide viewing angles and are stable at zero and high fields, as well as methods for fabricating such multi-domain LC cells and LCDs, particularly methods that are inexpensive and eliminate the photolithographic steps required for producing multiple alignment directions.

SUMMARY OF THE INVENTION

The present invention provides multi-domain liquid crystal cells (i.e., "pixels") having twist angles less than 90 degrees, and LCDs containing such liquid crystal cells. Such liquid crystal cells are stable, particularly at zero and high fields, and provide wide viewing angles. The present invention also discloses improved methods, based on using an adjustable particle beam in combination with a mask, for generating multi-domains alignments. Such methods are useful for producing liquid crystal cells in general, and for producing the novel multi-domain low twist angle liquid crystal cells of the present invention in particular.

DESCRIPTION OF THE PREFERRED EMBODIMENTS

The present invention, according to a preferred embodiment, overcomes problems with the prior art by providing multi-domain LC cells, and LC devices, particularly LCDs, comprised of such LC cells, that are stable at zero and at high fields and have wide viewing angles. In particular, the present invention provides multi-domain, low-twist angle nematic ("LTN") LC cells. The multi-domain structures of the LC cells serve to increase the viewing angle of such LC cells, particularly when the LC cells are incorporated in an LCD. In preferred embodiments, the LC cells are comprised of four domains, each domain having a different alignment direction. The low-twist angle of the LC cells, which is less than 90 degrees, serves to stabilize the multi-domain structures, particularly at zero and high fields.

The present invention further provides efficient, low cost methods of producing multi-domain LC cells and LC devices, particularly LCDs, comprised of such multi-domain LC cells. In particular, the present invention provides non-contact, non-rubbing methods of producing multi-domain LC cells having multiple alignment directions without the need for photolithography. In preferred embodiments, the present invention utilizes an adjustable (i.e., "rotatable") particle source coupled with a mask that is positioned between the substrate and the particle source that allows for the irradiation of selected regions of a substrate surface. Multi-directional alignment of a substrate surface can be achieved, for example, through multiple passes of the particle source across the substrate surface and adjustment of the position of the particle source between passes, thereby enabling the production of multi-domain LC cells and wide-viewing angle LCDs at low cost. The present invention eliminates the photolithographic steps previously needed to generate multiple alignment directions on a substrate in order to fabricate multi-domain LC cells and LCDs comprised of such multi-domain LC cells.

As used herein, the terms "alignment direction" and "director orientation" may be used interchangeably. However, "alignment direction" is generally used to refer to a physical alignment of a substrate surface, whereas "director orientation" is generally used to refer to a preferred alignment direction of LC molecules, such as may be induced by an adjacent substrate surface having an alignment direction thereon. "Alignment direction" may be interchangeably referred to as "alignment orientation".

As used herein, the terms "particle" and "ion" are used interchangeably. Terms such as "particle", "ion", "particle source", "ion source", "particle beam" and "ion beam" are intended to include any particles, particle beams, and particle sources that are capable of generating an alignment on a substrate (including substrates having an alignment layer, such as diamond-like carbon film, thereon) including, but not limited to, ions and neutral particles, atomic beams, ion beams, ion guns, molecular beams, electron beams, and elementary particle beams, lasers and laser beams, photo-irradiation, electromagnetic radiation, ultraviolet radiation, and any devices capable of generating and/or deploying such particles and/or particle beams. Ions may include, but are not limited to, oxygen, nitrogen, carbon, hydrogen, fluorocarbons, hydrocarbons, chlorine, and argon, as well as combinations and mixtures of these, such as mixtures of any of these ions with a noble gas.

As used herein, terms such as "aligning", "irradiating", "scanning", and "bombarding" are used interchangeably to refer to the process of generating an alignment direction on a substrate surface, preferably by using a particle beam, however such terms may encompass any technique used to generate an alignment such as rubbing techniques, as well as combinations thereof, such as methods that combine both particle beam and rubbing techniques.

Multi-domain Low Twist Angle LC Cells and LCDs

The present invention provides LC cells having two or more alignment domains, wherein each alignment domain induces adjacent liquid crystal molecules to assume a preferred liquid crystal director orientation parallel to the alignment direction of the alignment domain. Preferably, the alignment direction of each domain is different than that of the other domains, and the twist angle of each domain is less than 90 degrees. Preferably, the twist angle is about 45 to 85 degree; more preferably, the twist angle is about 60 to about 85 degrees; and most preferably, the twist angle is about 70–80 degrees. Such low twist angles act to stabilize the domains. As discussed previously, multi-domain LC structures presently used in the art, which have twist angles of 90 degrees, are unstable at zero field in small pixels (e.g., less than about 300 microns) and at low normal pre-tilt angles. Furthermore, in preferred embodiments of the present invention, the multi-domain LC cells are comprised of four domains and each domain has an alignment direction that is different than the alignment direction of the other three domains. The invention further provides LC devices, particularly light-modulating devices such as LCDs, wherein at least one LC cell (i.e., pixel), preferably a majority of the LC cells, or more preferably substantially all of the LC cells, of the LC device are LC cells of the present invention. LCDs include, but are not limited to, direct view (e.g., thin film transistor or TFT) and projection displays, as well as transmissive and reflective type displays.

Although the present text and figures may illustrate methods for producing the LC cells of the present invention, it should be understood that the LC cells and LC devices of the present invention do not have to be produced by the exemplary methods depicted and described herein, and that the present invention encompasses LC cells and LC devices described herein regardless of their method of production.

FIGS. 1–6 depict schematic diagrams of three different exemplary four-domain LC cell configurations having twist angles less than 90 degrees, and methods for producing such LC cell configurations. FIGS. 1–6 depict four-domain structures, however any number of domains may be employed. Preferably, each domain possesses a different alignment direction in order to increase viewing angles, however, multiple domains may possess the same alignment direction if desired. FIGS. 1–6 are depicted as follows: The arrows in each sub-domain indicate a preferred direction of alignment during the manufacturing process (e.g., the direction of particle beam scanning or rubbing) as well as the subsequent alignment direction possessed by each LC cell. The arrows indicate exemplary alignment configurations of exemplary LC cells and exemplary alignment directions during exemplary fabrication processes; however, alternative alignment configurations and procedures could readily be utilized to generate the multi-domain LC cells of the present invention. For example, alignment directions may be in a direction opposite that which is indicated in the figures, LC cell domains may have different alignment directions than what is indicated in the figures, and/or LC cell domains may be produced by aligning in different directions or different angles than what is illustrated in the figures. The solid arrows represent the alignment direction of a first substrate, for example a top substrate, and the dashed arrows represent the alignment direction of a second substrate, for example a bottom substrate (references herein to a "top" or "bottom" substrate are merely for the purpose of clearly illustrating and describing exemplary embodiments of the present invention and are not intended to limit any substrate to a particular position relative to another substrate). The alignments are preferably generated by irradiation techniques, such as by using a particle beam or photo-irradiation, but can also be generated by rubbing techniques such as polyimide-based rubbing processes.

More preferably, the alignments are generated by using a rotatable particle source in combination with a mask, as described below. In general, the pre-tilt angle produced by particle beam or photo-irradiation based alignment methods is opposite that produced by rubbing methods; i.e., the pre-tilt angle generally tilts towards the particle beam source in particle beam-based alignment methods but follows the rubbing direction in rubbing-based alignment methods. Thus, the pre-tilt angle is generally tilted down relative to the arrow direction for particle beam or photo-irradiation alignment processes, or tilted up relative to the arrow direction for rubbing processes. The twist direction is indicated in each sub domain with respect to the rubbing directions, as follows: "L" indicates left hand rotation and "R" indicates right hand rotation; "T" represents twist distortion and "S" represents splay distortion. The rotation quartos are indicated by 1q, 2q, 3q, and 4q with respect to coordinate quarters.

Figure 1:
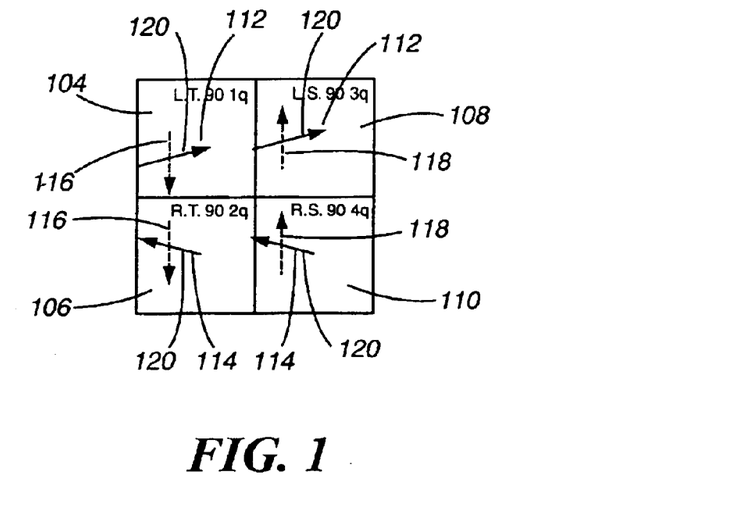
FIG. 1 is a diagram showing a top view of configuration 1 of a four-domain low-twist angle ("4D-LT") LC cell according to a preferred embodiment of the present invention.
Figure 2:
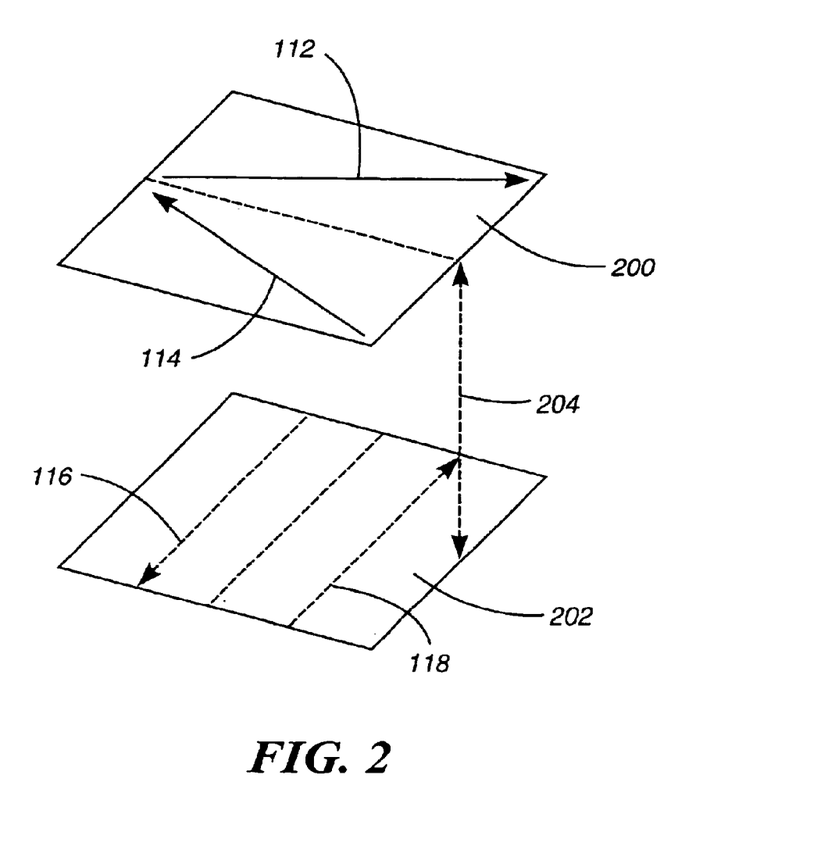
FIG. 2 is a diagram showing a three-dimensional view of the 4D-LT LC cell (configuration 1) depicted in FIG. 1.

FIGS. 1 and 2 depict an exemplary LC cell configuration of the present invention, referred to herein as "configuration 1". Four domains are depicted in FIGS. 1 and 2, however any number of domains could be utilized. FIG. 1 depicts a top view of an LC cell having configuration 1, illustrating the twist angles between the alignments of a top substrate 200 and a bottom substrate 202. FIG. 2 depicts a three-dimensional view of the LC cell of FIG. 1, illustrating both the top substrate 200 and the bottom substrate 202. In FIGS. 1 and 2, domain 104 (quorto 1q) has left hand rotation and splay distortion; domain 106 (quorto 2q) has right hand rotation and splay distortion; domain 108 (quorto 3q) has left hand rotation and twist distortion; and domain 110 (quorto 4q) has right hand rotation and twist distortion. In configuration 1, the high-energy splay domains and low-energy twist domains form strips (i.e., the high-energy splay domains are arranged in juxtaposition, and the low-energy twist domains are arranged in juxtaposition), which have larger domains and would tend to be more stable than in configuration 2 described below, in which the twist and splay domains form checkerboard patterns. Preferably, in multi-domain LTN LC cells, half of the domains (e.g., two domains in a four-domain LTN LC cell) are twist domains and the other half are splay domains and, furthermore, preferably half of the domains have left-hand rotation and the other half have right-hand rotation. The solid arrows 112 and 114 indicate the direction of alignment on the top substrate 200 and the dashed arrows 116 and 118 indicate the direction of alignment on the bottom substrate 202. In FIGS. 1 and 2, the twist angles 120 are less than 90 degrees, preferably between about 45 to about 85 degrees, more preferably between about 60 to about 85 degrees, and most preferably between about 70 to about 80 degrees. The twist angle 120 is perpendicular (i.e., 90 degrees) in prior art four-domain LC cells. In the exemplary LC cell configurations illustrated in FIG. 1 and elsewhere in the present application, all the domains have substantially the same twist angle 120. However, if desired, different domains within the same LC cell may have different twist angles 120. In such alternative embodiments, however, the twist angle of each domain is preferably less than 90 degrees, even though different domains may have different twist angles.

Figure 3:
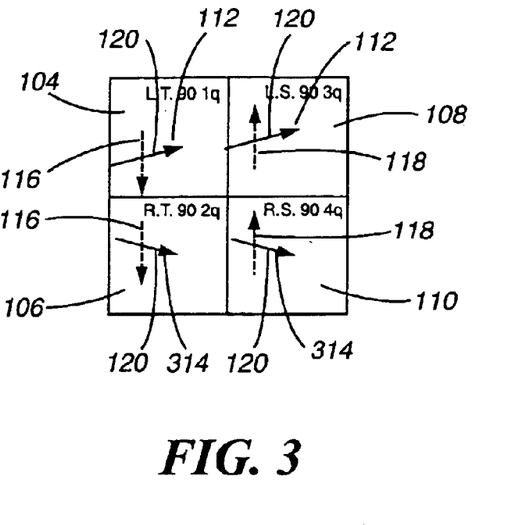
FIG. 3 is a diagram showing a top view of configuration 2 of a 4D-LT LC cell according to a preferred embodiment of the present invention.
Figure 4:
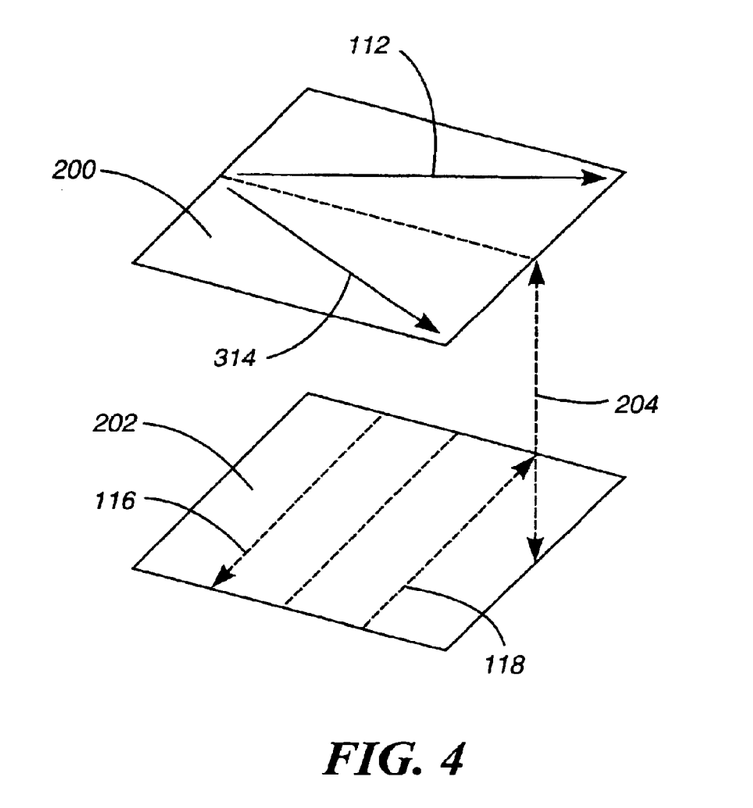
FIG. 4 is a diagram showing a three-dimensional view of the 4D-LT LC cell (configuration 2) depicted in FIG. 3.

FIGS. 3 and 4 depict an alternative exemplary LC cell configuration of the present invention, referred to herein as "configuration 2". Four domains are depicted in FIGS. 3 and 4, however any number of domains could be utilized. FIG. 3 depicts a top view of an LC cell having configuration 2, illustrating the twist angles between the alignments of a top substrate 200 and a bottom substrate 202. FIG. 4 depicts a three-dimensional view of the LC cell of FIG. 3, illustrating both the top substrate 200 and the bottom substrate 202. FIGS. 3 and 4 are the same as FIGS. 1 and 2 except that the alignment direction of arrows 314 is opposite that of arrows 114. This causes domain 106 (quorto 2q) to have splay distortion (but retain right hand orientation) and domain 110 (quorto 4q) to have twist distortion (but retain right hand orientation). Domains 104 (quorto 1q) and 108 (quorto 3q) remain the same as in FIGS. 1 and 2. As in FIGS. 1 and 2, the twist angles 120 in FIGS. 3 and 4 are less than 90 degrees, preferably between about 45 to about 85 degrees, more preferably between about 60 to about 85 degrees, and most preferably between about 70 to about 80 degrees. As in the exemplary configuration illustrated in FIG. 1, all the domains have substantially the same twist angle. However, in other embodiments, different domains within the same LC cell may have different twist angles. In such alternative embodiments, however, the twist angle of each domain is preferably less than 90 degrees, even though different domains may have different twist angles.

Figure 5:
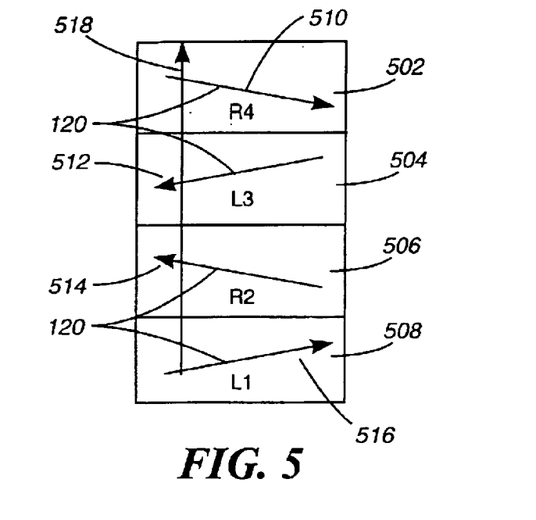
FIG. 5 is a diagram showing a top view of configuration 3 (also referred to as the stripe configuration) of a 4D-LT LC cell according to a preferred embodiment of the present invention.
Figure 6:
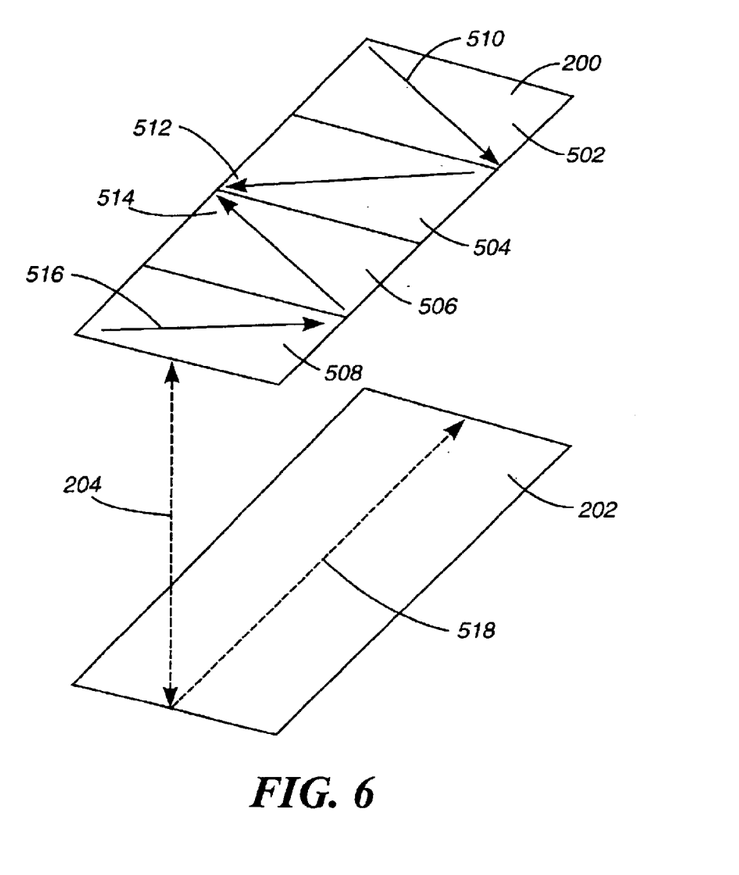
FIG. 6 is a diagram showing a three-dimensional view of the 4D-LT LC cell (configuration 3) depicted in FIG. 5.

FIGS. 5 and 6 depict an alternative exemplary LC cell configuration of the present invention, interchangeably referred to herein as "configuration 3" or the "stripe configuration". Four domains are depicted in FIGS. 5 and 6, however any number of domains could be utilized. FIG. 5 depicts a top view of an LC cell having configuration 3, illustrating the twist angles between the alignments of a top substrate 200 and a bottom substrate 202. FIG. 6 depicts a three-dimensional view of the LC cell of FIG. 5, illustrating both the top substrate 200 and the bottom substrate 202. In the exemplary embodiment illustrated in FIGS. 5 and 6, the top substrate 200 is arranged into multiple parallel stripes, each representing a different alignment domain having a different alignment direction, and the bottom substrate 202 is aligned in one direction. However, in alternative embodiments, both the bottom substrate 202, as well as the top substrate 200, may possess multiple alignment domains. In FIGS. 5 and 6, the alignment domains on the top substrate are divided into four domains 502, 504, 506, and 508, which are designated R4, L3, R2, and L1, respectively. Preferably, each of the four domains is of equal size and covers about a fourth of the surface area of the substrate; however, if desired, the domains may differ in size. In the preferred embodiments, the domains alternate between right hand and left hand rotation; for example, in FIGS. 5 and 6, domains 502 and 506 have right hand rotation and domains 504 and 508 have left hand rotation. Thus, in the exemplary embodiment depicted in FIGS. 5 and 6, four alignment domains are arranged in juxtaposition, and these alignment domains alternate between right-hand rotation and left-hand rotation. Alternatively, domains having the same rotation may be arranged adjacent one another. In FIGS. 5 and 6, twist domains (domains 502 and 504) are arranged adjacent one another, and splay domains (domains 506 and 508) are arranged adjacent one another. Alternatively, the domains may alternate between twist and splay domains. As in configurations 1 and 2, the twist angles 120 in FIGS. 5 and 6 are less than 90 degrees, preferably between about 45 to about 85 degrees, more preferably between about 60 to about 85 degrees, and most preferably between about 70 to about 80 degrees. All the domains can have substantially the same twist angle or, alternatively, different domains within the same LC cell may have different twist angles. In such alternative embodiments, however, the twist angle of each domain is preferably less than 90 degrees, even though different domains may have different twist angles.

FIGS. 2, 4, and 6 depict a pair of substrates 200 and 202, which have a different multi-domain alignment configuration in each figure, spaced adjacent one another. The aligned surface of each substrate faces the opposing substrate in order to contact the LC medium, which would be disposed in cell gap 204 in an assembled LC cell. The alignment domains on the surface of each substrate (i.e., on the surface of each substrate that faces the opposing substrate and contacts the LC medium) induce the LC molecules adjacent each alignment domain to assume a preferred director orientation that is parallel to the alignment direction of the alignment domain, and the twist angle formed by the different alignment directions on opposing substrates causes the LC molecules to assume a twisted arrangement extending through cell gap 204 between substrates 200 and 202. The cell gap 204 in an assembled LC cell may be, for example, about five microns wide. The substrates 200 and/or 202 may be comprised of, for example, glass, quartz, silicon, plastic, etc., or a variety of other materials that are optically transparent, particularly in the visible spectrum. Optionally, either or both of substrates 200 and 202 may be coated with an alignment film on the surface that contacts the LC medium, wherein the alignment film possesses one or more alignment directions and induces a corresponding director orientation in the adjacent LC medium. Thus, the term "substrate", as used herein, may interchangeably refer to an alignment film and/or an alignment film coupled with a substrate. For particle beam alignment methods, the alignment film may preferably be, for example, diamond-like carbon (DLC) film having a preferred thickness of about 10 nm to about 100 nm. However, a wide variety of materials that are optically transparent, particularly in the visible spectrum, can be used in alignment film in place of, or in combination with, DLC film. Either organic (e.g., polyimide, polyamide, polyurethane, or polyurea) and/or inorganic materials can be used in alignment film. Such alignment films can be used with either particle beam-based alignment methods or rubbing techniques.

Figure 7:
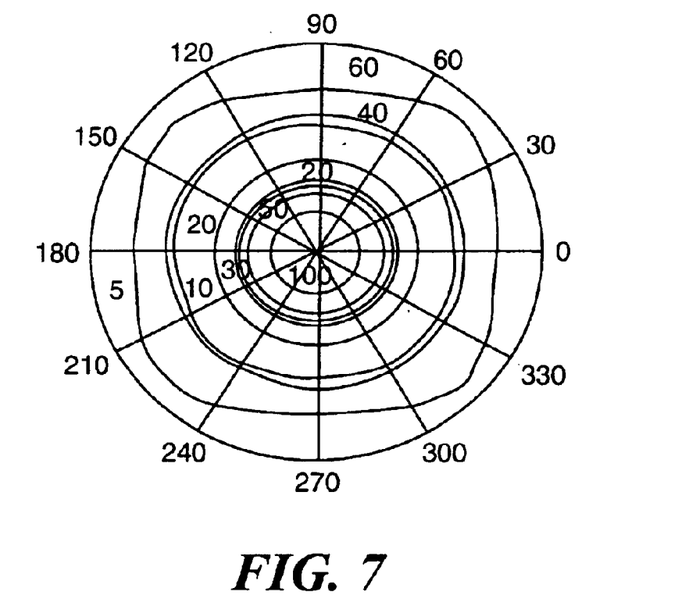
FIG. 7 is a diagram illustrating simulated iso-contrast curves for a 4-D TN LC cell having a 90-degree twist angle.
Figure 8:
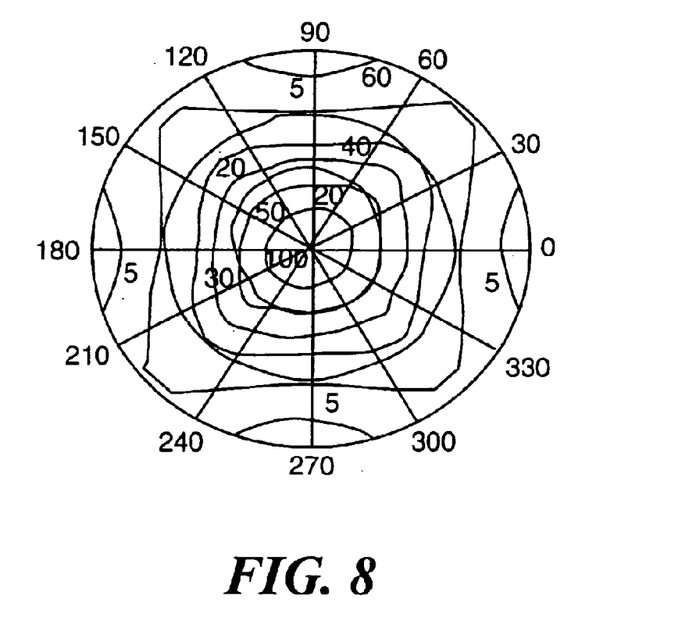
FIG. 8 is a diagram illustrating simulated iso-contrast curves for a 4-D TN LC cell having an 80-degree twist angle.

FIGS. 7 and 8 provide simulated iso-contrast curves for four-domain TN LC cells having 90-degree twist angles ("4D-90TN LC cells"), shown in FIG. 7, and 80-degree twist angles ("4D-80TN LC cells"), shown in FIG. 8. FIG. 7 is simulated at 0 and 5V, and FIG. 8 is simulated at 0 and 7V. FIGS. 7 and 8 illustrate the similarity in viewing angles of 4D-80TN LC cells compared with 4D-90TN LC cells. However, 4D-90TN LC cells are unstable, whereas four-domain TN LC cells having low-twist angles (i.e. twist angles less than 90 degrees), such as 4D-80TN LC cells, are stable. Thus, multi-domain low-twist angle nematic LC cells, as provided by the present invention, provide increased stability, particularly at zero and high fields, while still providing high viewing quality and wide viewing angles.

Figure 9:
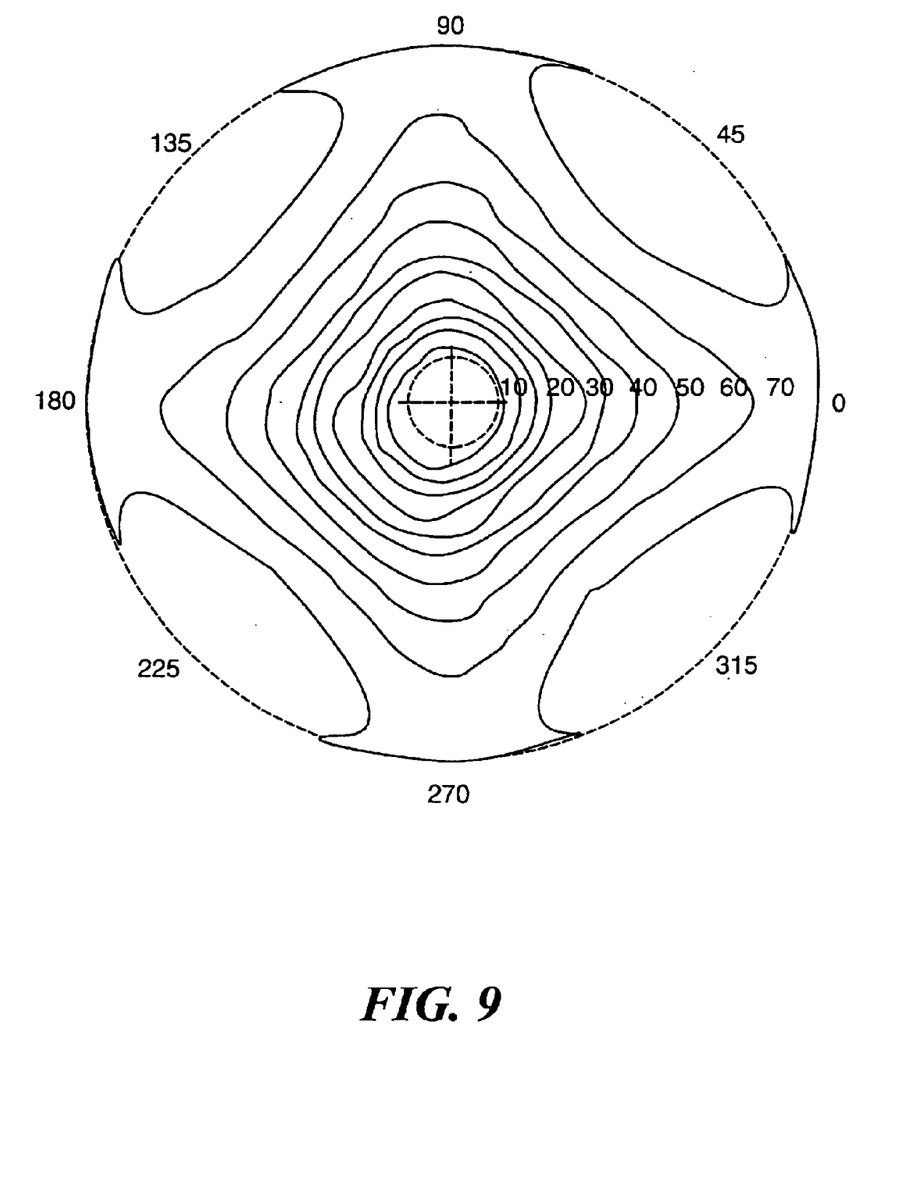
FIG. 9 is a diagram illustrating measured iso-contrast curves for a 4-D TN LC cell having an 80-degree twist angle.

FIG. 9 provides measured iso-contrast curves for a 4D-80TN LC cell that was fabricated using IB/DLC alignment with a scanning mask (as described below). The symmetry of FIG. 9 indicates that the 4D-80TN LC cell was stable.

Devices and Methods for Producing Multi-domain LC Cells and LCDs

The present invention provides devices and methods for producing LC cells, particularly multi-domain LC cells, and LC devices such as LCDs. The devices and methods provided herein are particularly well suited for producing LC cells and LCDs in general, and for producing the low twist angle multi-domain LC cells of the present invention, and LCDs comprised of such cells, in particular. Preferred devices of the present invention include an adjustable particle source in combination with a mask, and preferred methods provided by the present invention for producing LC cells and LCDs are based on using an adjustable particle source, such as an ion gun having a rotatable head, in combination with a mask to generate multi-directional alignments of a substrate surface (such methods may be referred to herein as "particle beam-based methods" or "ion beam-based methods).

Particle beam-based alignment methods generally involve directing a particle beam, such as a collimated linear ion beam ("IB"), onto a substrate at a pre-determined angle. When using particle beam-based methods, preferably at least one of the substrates, particularly a substrate that is to be imparted with multiple alignment domains (e.g., substrate 200 in FIGS. 6 and 7), is coated with an alignment film. A preferred alignment film is diamond-like carbon (DLC) film, which is preferably about 10 nm to about 100 nm in thickness and preferably coated on at least one substrate. Thus, particle beam-based alignment methods may interchangeably be referred to herein as "IB/DLC" alignment methods. Particle beam-based methods are inexpensive and enable multi-directional alignment of a substrate surface without photolithographic processing steps, which can lead to contamination and reliability problems. Furthermore, ion beam alignment methods typically allow previous irradiations/alignments of a substrate to be over-written by a second or subsequent irradiation, thereby simplifying the alignment process. Preferred particle beam-based methods of the present invention for generating multi-domain alignments are based on using an adjustable (interchangeable referred to herein as "rotatable") particle source, such as an ion gun having a rotatable head, coupled with a mask. However, multi-domain alignment can also be readily generated by using, for example, multiple fixed ion sources and/or by translating a substrate through multiple positions and/or different slant angles. Alternatives to IB methods, such as rubbing methods (particularly rubbing of polyimide films), may also be used to generate the multi-domain LC cells of the present invention such as the 4D-LTN LC cells depicted in FIGS. 1–6, and LCDs comprising such cells.

Figure 10:
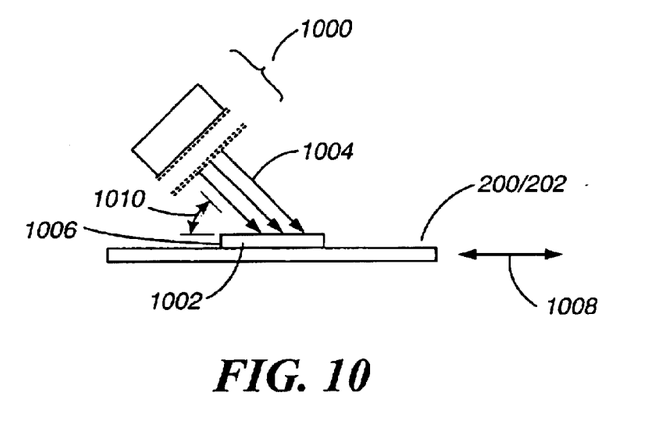
FIG. 10 is a diagram illustrating a side-view of a particle source, the particle source directing a particle beam, and mask for generating an alignment on a substrate in accordance with a preferred embodiment of the present invention.

An exemplary configuration of a particle source and scanning mask for aligning a substrate is shown in FIG. 10. A particle source 1000 is positioned so as to direct a particle beam 1004 in the desired direction of LC alignment. As shown in FIG. 10, a mask 1002 is positioned between the particle source 1000 (interchangeably referred to as an ion source) and a substrate 200 (or, interchangeably, substrate 202). The particle source 1000 directs a particle beam 1004 through the mask 1002 at substrate 200 in order to align the surface of substrate 200. The angle at which a particle source 1000 is positioned relative to a substrate 200, and hence the angle of incidence of the particle beam 1004 on the substrate surface, is indicated by incidence angle 1010. The incidence angle 1010 may be, for example, from about 1 to about 90 degrees, preferably about 15 degrees to about 45 degrees. The mask 1002 is preferably positioned in a fixed position relative to the particle source 1000; however, in some embodiments, the position of the mask 1004 may be adjusted relative to the particle source 1000. If desired, the mask 1002 can be coupled to the ion source 1000, and any of a variety of possible arrangements can be implemented to couple the mask with the particle source. The mask 1002 can be, for example, coupled to a fixed portion of a particle source 1000 such that the mask remains in a fixed position when an adjustable member (e.g., a rotatable head) of a particle source 1000 is adjusted/rotated.

Alternatively, the mask 1002 may be coupled to an adjustable member (e.g., a rotatable head) of a particle source 1000 such that the mask adjusts together with the adjustable member of particle source 1000. Either of these arrangements are encompassed by references to the mask being coupled to a particle source or an adjustable particle source. In yet another arrangement, the mask is not coupled to the particle source, but is either in a fixed or adjustable position without any structural attachment to the particle source. For example, the mask 1002 can be fixed (i.e., attached) to a substrate 200 (so as either to be spaced a distance 1006 from the substrate or, if desired, to be in contact with the substrate). Thus, the mask 1002 may either be structurally independent of the particle source 1000, or structurally connected (i.e., attached) to a portion of the particle source 1000. However, although the mask 1002 may be either structurally attached to, or structural independent of, the particle source 1000, the mask 1002 is preferably configured so as to be a fixed distance from the particle source 1000 and/or a substrate 200. For example, utilizing an arrangement whereby the mask 1002 is fixed to a substrate 200 enables the mask to maintain a fixed distance 1006 from the substrate 200. However, if desired, the particle source 1000 and/or mask 1002 may be configured so that the distance between the particle source 1000 and the mask 1002, and/or the distance 1006 between the mask 1002 and a substrate 200, is adjustable. Although the mask 1002 is preferably positioned within close proximity to the substrate 200, the mask is preferably spaced a distance 1006 from the substrate so as not to contact the substrate. For example, the mask 1002 may be positioned about 1 mm to about 5 mm from the substrate 200. Thus, distance 1006 is preferably about 1–5 mm, although distances greater or less than 1–5 mm may be utilized. By configuring the mask 1002 so as not to contact the substrate 200, the introduction of unintended distortions and defects in the substrate surface as well as the introduction of contamination, including contamination by debris or static charges, is avoided. If desired, however, the mask 1002 can be configured so as to contact the substrate; in this situation, distance 1006 is substantially 0 mm. Preferably, substrate 200 is scanned beneath the mask 1002 and particle source 1000 (or, for example, scanned above the mask 1002 if the particle source 1000 is positioned below the mask so as to direct a particle beam 1004 upwards through mask 1002) as indicated by the exemplary substrate travel direction shown by arrow 1008.

Thus, during at least a portion of the alignment method, the substrate may typically be in motion (interchangeably referred to herein as "moving", "adjusting", "scanning", "traveling", "translating", or "rotating") beneath the particle source and mask, such as in the direction indicated by travel direction 1008. Alternatively, the particle source (e.g., a rotatable ion beam head) and/or mask can be in motion while the substrate remains stationary, or both the particle source (and/or mask) and substrate may both be in motion. These alternative arrangements of adjusting/moving the position of at least one of the substrate, the particle source, and/or the mask may be collectively referred to herein as "adjusting the position of the particle source relative to the substrate".

Figure 11:
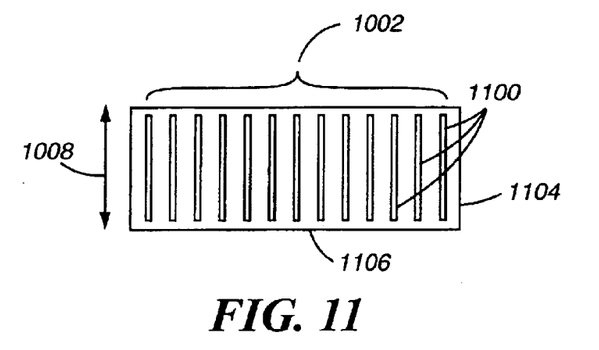
FIG. 11 is a diagram illustrating an exemplary mask that can be used in combination with a particle source for generating an alignment on a substrate in accordance with a preferred embodiment of the present invention.

An exemplary mask 1002 is shown in FIG. 11. The mask 1002 may typically have one or more holes 1100 that allow particles (e.g., ions) to pass through the holes 1100 in order to irradiate one or more selected regions of a substrate surface, thereby imparting a pre-determined alignment direction to one or more specific substrate regions and forming one or more discrete alignment domains, while blocking other regions of the substrate from particle exposure. Any material that is capable of blocking the type of particles that are used to align a substrate surface can be used as a mask. Masks can be, for example, mechanical masks or photo-resist masks. Arrow 1008 indicates an exemplary substrate travel direction beneath the mask (for instances in which the particle source 1000 is positioned above the mask); alternatively, the mask (and/or particle source) can be moved relative to the substrate. The holes 1100 can be, for example, a series of slits (i.e., substantially rectangular-shaped holes), as illustrated in FIG. 11. As an alternative to having holes 1100, a mask may, for example, be designed so as not to have any holes 1100, thereby only allowing particles to pass around the outside of one or more edges 1104 or 1106 of the mask in order to irradiate a substrate surface. Preferably, the width of the mask (which generally corresponds with edge 1106) is equal to, or wider than, the width of the substrate, and the length of the mask (which generally corresponds with edge 1104) covers the width of the particle beam when the particle source is rotated to a rotation maximum angle (e.g., up to about 89-degrees, depending on the desired twist angle) relative to edge 1106 (i.e., corresponding to the maximum possible degrees of angles 1206 and/or 1208; see FIGS. 12 and 13). Thus, the length of the mask will typically depend on the potential degree of rotation of the particle source and the width of the particle source. In an exemplary configuration of the present invention, a mask 1002 having a series of slits can be positioned so that the lateral edges 1104 of the mask are parallel with the substrate travel direction 1008. This enables a particle beam to impart parallel strips of a substrate with a pre-determined alignment orientation, such as to produce an LC cell having configuration 3 or a similar configuration of parallel strips. Masks for use in the present invention can be readily produced by photolithographic processes well known in the art, or by any other suitable fabrication process known to one of ordinary skill in the art.

Figure 12:
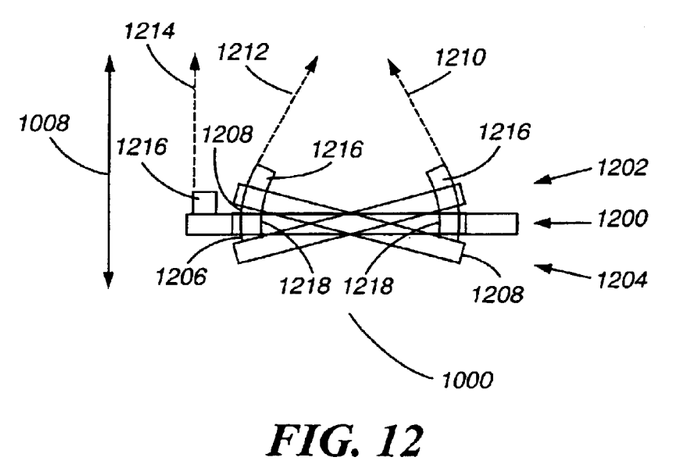
FIG. 12 is a diagram illustrating multiple positions of an adjustable particle source (e.g., ion gun) for generating multi-directional alignments on a substrate in accordance with a preferred embodiment of the present invention.

In preferred embodiments of the present invention, the particle source 1000 can be adjusted/rotated through multiple positions (interchangeably referred to herein as "IB head positions"), as illustrated in FIG. 12. In the exemplary embodiment illustrated in FIG. 12, the particle source can be adjusted through at least two alternative positions 1202 and 1204, plus a default position 1200; however, any number of IB head positions can be utilized to produce any number of alignment domains and twist angles. A typical substrate travel direction 1008 relative to the alternative IB head positions is indicated (or, alternatively, 1008 may represent the travel direction of the particle source relative to a fixed substrate). Alignment directions 1210, 1212, and 1214 (i.e., the direction of particle/ion beam bombardment) are generally perpendicular (90 degrees) to each IB head position, as indicated by angle 1216. Consequently, angles 1206 and 1208 (which are preferably the same but opposite; however, angles 1206 and 1208 can be different than each other if desired) formed between a default position 1200 and alternative positions 1202 and 1204 correspond to the desired twist angle of an LC alignment domain formed by adjacent substrates in which one substrate has an alignment direction 1214 corresponding to position 1200 and the opposing substrate has an alignment direction 1210 or 1212 corresponding to positions 1202 or 1204, respectively. For multi-domain LC cells of the present invention, the twist angle (i.e., angle 1206 and/or 1208) is preferably about 45 to about 85 degrees, more preferably about 60 to about 85 degrees, and most preferably about 70 to about 80 degrees. In other embodiments, an LC domain may be formed by adjacent substrates in which one substrate has an alignment direction 1210 corresponding to positions 1202 and an opposing substrates has an alignment direction 1212 corresponding to position 1204, thereby forming a twist angle corresponding to angle 1218. In exemplary embodiments, such as that illustrated in FIG. 13, two alternative IB head positions 1202 and 1204 can be used in combination with a mask 1002 to form four different alignment regions.

Thus, in preferred embodiments, a substrate 200 can be scanned beneath a particle source 1000 and mask 1002 and the in-plane rotational angle of the particle source 1000 relative to the substrate can be adjusted. This rotatability of the particle source 1000 enables each selected area of substrate 200 (i.e., each domain) to be aligned in a pre-determined direction. The placement of the mask 1002 between the particle source 1000 and the substrate 200 allows particles (e.g., ions) to strike and align substrate 200 only in the areas that are exposed to the particle source. Areas of substrate 200 that are not intended to possess the alignment direction that is being imparted by the particle source 1000 are blocked from ion exposure by the mask 1002, and thus are prevented from being aligned. Multiple domains can each be aligned by repositioning a mask 1002 so that a different area of the substrate surface (representing each domain) is exposed to the particle beam 1004 and, if desired, reorienting the particle source 1000 to a different position and, hence, alignment direction. This process can be repeated as many times as desired to achieve the desired number of alignment domains. Preferably, each domain is imparted with a different alignment direction in order to increase viewing angles; however, multiple domains may be imparted with the same alignment direction if desired.

As an alternative to using an adjustable particle source, multiple alignment domains can be formed by scanning (i.e., moving) a substrate under multiple particle sources, such as multiple IB heads, each of which may have a different fixed head position that corresponds to the desired alignment direction and resultant twist angle of each domain. Such scanning is preferably carried out by using a mask positioned between each particle source and substrate that allows exposure of one or more selected regions of the substrate to the particle source. For example, a substrate can be moved under four different IB heads, each of which may have a different head position, in order to generate four alignment regions, each of which may have a different alignment direction.

Alternatively, a substrate can be translated at slant angles under one or more particle sources, preferably in combination with a mask that restricts particle exposure to one or more selected regions of the substrate. Thus, by rotating a substrate in-plane under a particle source and irradiating selected regions of the substrate surface at different slant angles, different alignment directions and alignment domains can be generated. The angle at which the substrate slants with respect to each particle source corresponds to the desired alignment direction and resultant twist angle of each domain. Thus, compared with using a an adjustable particle source, the slant positions of a substrate correspond with alternative particle source positions 1202 and 1204, and the angles at which each substrate slants correspond with angles 1206 and 1208. For multi-domain LC cells of the present invention, this slant angle, and corresponding twist angle, is preferably about 45 to about 85 degrees, more preferably about 60 to about 85 degrees, and most preferably about 70 to about 80 degrees.

Exemplary Methods for Producing Multi-domain LC Cells and LCDs Using a Particle Beam and Mask The novel methods provided by the present invention for generating multi-domain alignments on a substrate surface using a particle beam and scanning mask are well-suited for producing multi-domain LC cells having a wide variety of configurations, as well as for producing LC devices such as LCDs containing multi-domain LC cells. The novel methods described herein can be used to produce the novel multi-domain low-twist angle nematic LC cells provided herein, and can also be used to produce other LC cells, such as TN LC cells having 90 degree twist angles and single domain TN LC cells. Thus, although the following examples are generally directed at producing the novel multi-domain low-twist angle LC cells of the present invention, the novel methods provided herein are not limited to producing the novel LC cells of the present invention but can also be used to produce a wide variety of other LC cells, including those well-known in the art. In such instances, the methods of the present invention improve the production efficiency and reduce the manufacturing costs of producing LC cells compared with prior art methods of LC cell production.

To produce LC cell configuration 1, which is depicted in FIGS. 1 and 2, an exemplary alignment process may be carried out as follows. A blank irradiation (i.e., a scan without a mask) can be carried out on a substrate 202 with the particle source in position 1200. In this instance, the position of the particle source is perpendicular to the substrate travel direction 1008 and the particle source generates an alignment direction 1214 (corresponding to arrows 116 in FIGS. 1 and 2) on substrate 202 that is parallel to the substrate travel direction 1008. The blank irradiation will generally align the entire portion of the surface of substrate 202 that is exposed to the irradiation in a single direction. Following the blank irradiation, the substrate 202 (or the particle source 1000) is rotated by 180 degrees, and a second irradiation is carried out using a mask 1002 that allows exposure of a portion (e.g., half) of the substrate surface to irradiation. For example, the mask 1002 may be comprised of one or more slit-shaped holes 1100 that are parallel to the substrate travel direction and that expose half of the substrate surface. The half of the substrate surface that is exposed by the mask, which had been aligned in one direction by the first irradiation, will then be over-written by the second irradiation with an alignment direction 1214 (corresponding to arrows 118). In this exemplary process, two alignment domains will thereby be formed that differ in their alignment direction by 180 degrees due to the 180 degree rotation between irradiations. To align substrate 200, the particle source 1000 can be rotated to position 1202, which makes an angle 1206 with respect to the substrate travel direction 1008, and a first irradiation (corresponding to arrows 114) can be directed at substrate 200. Substrate 200 (or particle source 1000) can then be rotated by 180 degrees, and particle source 1000 can be rotated to position 1204, which makes an angle 1208 with respect to travel direction 1008. Angle 1206 is preferably the same but opposite angle 1208; however, angle 1206 may be different than angle 1208 if desired. A second irradiation can then be directed at substrate 200 (corresponding to arrows 112). A single mask 1002 having, for example, one or more slit-shaped holes 1100 that are parallel to the travel direction which expose a portion (e.g., half) of the substrate surface, can be used for both the first and second irradiations. Alternatively, the first irradiation can be a blank irradiation without a mask, and the second irradiation, in combination with a mask, can over-write a portion (e.g., half) of the alignment generated by the first irradiation with a different alignment direction.

Four domain LC cells having configuration 1, as illustrated in FIGS. 1 and 2, can be produced by irradiating (or rubbing, if desired) the top substrate 200 twice and the bottom substrate 202 twice, for a total of four irradiation steps. For example, the top substrate 200 can be irradiated a first time corresponding to arrows 112, and irradiated/rubbed a second time corresponding to arrows 114. The bottom substrate 202 can be irradiated a first time corresponding to arrows 116, and irradiated a second time corresponding to arrows 118. The top substrate 200 and bottom substrate 202 can then be assembled so as to be spaced adjacent one another with the aligned surfaces facing each other, forming four alignment domains 104, 106, 108, and 110. An LC medium, particularly a nematic LC material, can be inserted (e.g., vacuum-injected) in the cell gap 204 between the top substrate 200 and the bottom substrate 202, thereby forming an LC cell, which can further be incorporated into an LC device such as an LCD.

To produce LC cell configuration 2, which is depicted in FIGS. 3 and 4, an exemplary alignment process may be carried out in a similar manner as described above for configuration 1, with the exception that substrate 200 is not rotated 180 degrees between the first and the second irradiations. Thus, with the particle source in position 1204 during the second irradiation of substrate 200, an alignment corresponding to arrow 314 is formed.

As with configuration 1, four domain LC cells having configuration 2, as illustrated in FIGS. 3 and 4, can be produced by irradiating (or rubbing) the top substrate 200 twice and the bottom substrate 202 twice, for a total of four irradiation steps. For example, the top substrate 200 can be irradiated a first time corresponding to arrows 112, and irradiated a second time corresponding to arrows 314. The bottom substrate 202 can be irradiated a first time corresponding to arrows 116, and irradiated a second time corresponding to arrows 118. As with the process described above for producing configuration 1, precision displacement of the mask is not required. The top substrate 200 and bottom substrate 202 can then be assembled so as to be spaced adjacent one another with the aligned surfaces facing each other, forming four alignment domains 104, 106, 108, and 110. An LC medium, particularly a nematic LC material, can be inserted in the cell gap 204 between the top substrate 200 and the bottom substrate 202, thereby forming an LC cell, which can further be incorporated into an LC device such as an LCD.

Four domain LC cells having configuration 3 (stripe configuration), as illustrated in FIGS. 5 and 6, can be produced by irradiating (or rubbing) the top substrate 200 four times and the bottom substrate 202 once, for a total of five irradiation steps. For example, the top substrate 200 can be irradiated as indicated by arrows 510, 512, 514, and 516, and the bottom substrate 202 can be irradiated as indicated by arrow 518. The top substrate 200 and bottom substrate 202 can be assembled so as to be spaced adjacent one another with the aligned surfaces facing each other, forming four alignment domains 502, 504, 506, and 508. An LC medium, particularly a nematic LC material, can be inserted in the cell gap 204 between the top substrate 200 and the bottom substrate 202, thus forming an LC cell which can further be incorporated into an LC device such as an LCD.

The arrows depicted in FIGS. 5 and 6 indicate an exemplary process for producing a four-domain LC cell having configuration 3, such as by using an IB (or by rubbing). In the exemplary embodiment shown in FIGS. 5 and 6, a first substrate is divided into four domains designated 502 (R4), 504 (L3), 506 (R2), and 508 (L1). The dashed arrow 518 in FIGS. 5 and 6 shows the direction of a unidirectional alignment, which is preferably carried out without a mask (referred to herein as a "blank scan" or "blank irradiation"), on a bottom substrate 202. In using alignment methods that allow previous alignments to be re-written, such as IB-based methods, a first scan of a substrate can optionally be a blank scan, which will serve to align the entire area of the substrate surface that is exposed to the particle beam in one direction and then each subsequent irradiation will re-write selected substrate regions in different alignment directions.

For example, in FIGS. 5 and 6, a blank scan can first be carried out on the top substrate 200 along the direction of arrow 510 and then each subsequent domain can be formed by re-writing the alignment corresponding to arrow 510 by irradiating the substrate in a different direction. Alternatively, a mask can be used during the first irradiation to restrict alignment to a pre-determined region of the substrate; for example, in FIGS. 5 and 6, a mask that covers domains 504, 506, and 508 and only allows domain 502 to be exposed to a scan in the direction of arrow 510, can be used during the first irradiation. After a first irradiation (which can be either a blank irradiation or a masked irradiation, as just described) along the direction of arrow 510, an L3 mask can be positioned to cover domain 502, 506, and 508. A second irradiation, in the direction of arrow 512, can then be carried out on domain 504. After the removal of the L3 mask, an R2 mask can then be positioned to cover domains 502, 504, and 508, and a third irradiation, in the direction of arrow 514, can then be carried out. After the removal of the R2 mask, an L1 mask can then be positioned to cover domains 502, 504, and 506, and a fourth irradiation can be carried out, in the direction of arrow 516. The top substrate 200 and the bottom substrate 202 can then be assembled to form a four-domain LC cell, or an LC cell having any desired number of domains. Liquid crystal molecules, preferably a nematic LC medium without chiral additive, can be inserted into the LC cell (however, as with other LC cell configurations described herein, a chiral LC medium can be used if desired that, for example, has right- and/or left-handed chirality). Such LC cells can be further incorporated into LC devices, particularly LCDs. This process of exposing one domain at a time to particle beam bombardment while masking other domains can be repeated to produce as many domains as desired. Furthermore, other masking combinations can be employed. For example, multiple domains can be exposed simultaneously in order to generate multiple domains having the same alignment direction. The angles 120 between the dashed arrow 518 and arrows 510, 512, 514, and 516 represent the twist angles and are preferably about 45 to about 85 degrees, more preferably about 60 to about 85 degrees, and most preferably about 70 to about 80 degrees.

Figure 13:
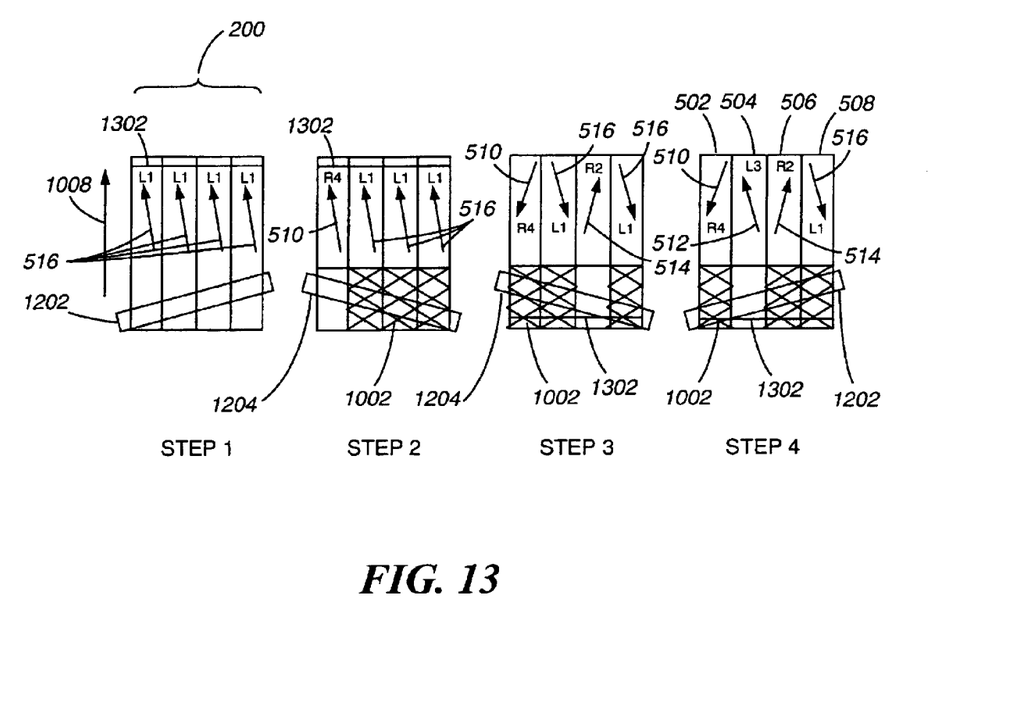
FIG. 13 is a diagram illustrating an exemplary process for producing a 4D-LT LC cell having configuration 3 using an adjustable particle source and mask in accordance with a preferred embodiment of the present invention.

FIG. 13 depicts an exemplary process of using a mask and a rotatable particle source to generate a four-domain, multi-directional alignment on a substrate. The substrate depicted in FIG. 13 corresponds to a top substrate 200 having configuration 3, as shown in FIGS. 5 and 6. In an exemplary process shown in FIG. 13, a substrate 200 is first irradiated with no mask in the direction of arrows 516 by a particle source in position 1202. Then a mask 1002 is positioned to allow alignment domain 502 to be exposed to a particle beam while blocking the other alignment domains (504, 506, and 508) from exposure to the particle beam, the particle source is re-positioned to position 1204, and the substrate is irradiated with a particle beam. The particle beam will rewrite the alignment in the exposed region (domain 502) from the direction of arrow 516 (which was imparted by the blank scan) to the direction of arrow 510 (and each subsequent direction). In the exemplary embodiment, the mask may have an opening that allows exposure of about one fourth of the substrate in order to generate four alignment regions that each of cover about one fourth of the surface area of the substrate. In the exemplary process shown in FIG. 13, the substrate 200 is then rotated by 180 degrees and the mask 1002 is shifted so that one or more holes 1100 in the mask are positioned to allow exposure of the particle beam to alignment domain 506 while blocking particle beam exposure to the other alignment domains, the particle source remains in position 1204 (alternatively, the particle source can be positioned to a third position that is different than positions 1202 or 1204), and the substrate is then irradiated with a particle beam. The substrate top 1302 is indicated in FIG. 13, illustrating the 180-degree rotation of substrate 200 between the second and third irradiations.

Finally, the mask 1002 is re-positioned to allow particle beam exposure to alignment domain 504 while blocking particle beam exposure to the other alignment domains, the particle source is re-positioned to position 1202 (alternatively, the particle source can be positioned to a fourth position that is different than any of positions 1202, 1204, and a third position, different than positions 1202 and 1204, that may have been used for the third irradiation), and the substrate is irradiated with a particle beam. The particle beam positions 1202 and 1204 correspond with the desired twist angle of each domain; for 4D-LTNs of the present invention, this twist angle is preferably about 45 to about 85 degrees, more preferably about 60 to about 85 degrees, and most preferably about 70 to about 80 degrees. The top substrate 200 and bottom substrates can then be assembled together with a bottom substrate 202, which is preferably aligned in a single direction corresponding to arrow 518, to form a LC cell. A liquid crystal medium, preferably a nematic LC medium without chiral additive, can then be inserted into the liquid crystal cell. Such LC cells can be further incorporated into an LC device such as an LCD.

It should be understood that although the exemplary processes described herein and depicted in the figures are generally directed at producing four-domain LC cells, the invention is not so limited, and LC cells having any desired number of domains, and LCDs comprised of such cells, can readily be produced using the methods described herein. LC cells having four domains are merely a preferred embodiment of the present invention. Furthermore, the steps of the processes described herein do not have to be carried out in the order described herein. The steps described herein may be described in a preferred order for the purpose of clearly illustrating the preferred methods of the present invention. However, it will be readily apparent that the methods of the present invention can be carried out in alternative orders. Such alternative orders are intended to be within the scope of the present invention.

The present invention utilizes a non-contact mask and non-contact alignment procedure, such as by using a particle beam or photo-irradiation, which enables multi-domain alignments to be efficiently and inexpensively generated. In particular, the present invention eliminates expensive photolithography processing steps and eliminates contamination and distortion of the alignment layer caused by such photolithography processing steps. Additionally, pixel registrated alignment is not required. Furthermore, the adjustability of the ion source and/or the mask in preferred embodiments provides a simpler mechanical design than what would be required to rotate a substrate which can be one or more meters in size. Thus, the present invention allows small and manageable masks to be implemented in the fabrication process as an alternative to manipulating large, unwieldy substrates.

This ease of manipulation provides selectivity in the alignment process, which is critical in the fabrication of multi-domain LCDs. The process can readily be automated since an entire substrate can be aligned without the need for additional processing steps such as the photolithographic processing steps that are required in polyimide rubbing techniques. Furthermore, the invention enables increased throughput of substrate alignments compared with prior art alignment methods since multi-directional alignment of a substrate surface can readily be accomplished by rotating an ion source to the desired alignment directions between multiple scans of the substrate beneath the ion source.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of generating multi-directional alignment domains on a substrate, comprising the steps of:
   positioning a particle source in a first position relative to the substrate, the particle source being capable of generating a particle beam;
   directing the particle beam at the substrate;
   exposing at least a first region of the substrate to the particle beam;
   whereby at least one alignment domain having a first alignment direction is generated;
   adjusting the position of the particle source relative to the substrate to at least a second position;
   positioning a mask between the particle source and the substrate, wherein the mask allows exposure of one or more selected regions of the substrate to the particle beam; and
   exposing at least a second region of the substrate to the particle beam,
   whereby at least one alignment domain is generated having an alignment direction different than the first alignment direction.

2. The method of claim 1, wherein the mask is spaced a distance from the substrate, and wherein the positioning of the mask is done after exposing the at least a first region of the substrate to the particle beam.

3. The method claim 1, further comprising the step of rotating the substrate between the exposing steps.

4. The method of claim 3, wherein the step of rotating comprises rotating the substrate about 180 degrees.

5. The method of claim 1, wherein each of the alignment domains has an alignment direction that is different than each of the other alignment domains.

6. The method of claim 1, wherein four alignment domains are generated.

7. The method of claim 6, wherein each of the four alignment domains has an alignment direction that is different than each of the other three alignment domains.

8. The method of claim 1, wherein the step of adjusting the position of the particle source relative to the substrate comprises at least one of: adjusting the position of the particle source, adjusting the position of the substrate, and adjusting the position of a mask that is positioned between the particle source and the substrate.

9. A method of producing a liquid crystal cell, comprising the steps of:
   providing a first substrate and a second substrate;
   generating multi-directional alignment domains on the first substrate by:
     positioning a particle source in a first position relative to the first substrate, the particle source being capable of generating a particle beam;
     directing the particle beam at the first substrate;
     exposing at least a first region of the first substrate to the particle beam, whereby at least one alignment domain having a first alignment direction is generated;
     adjusting the position of the particle source relative to the first substrate to at least a second position;
   positioning a mask between the particle source and the first substrate, wherein the mask allows exposure of one or more selected regions of the substrate to the particle beam; and
   exposing at least a second region of the first substrate to the particle beam, whereby at least one alignment domain is generated having an alignment direction different than the first alignment direction;
   generating at least one alignment direction on the second substrate;
   spacing the first substrate and the second substrate adjacent each other so as to create a cell gap; and
   inserting a liquid crystal medium in the cell gap.

10. The method of claim 9, wherein the liquid crystal medium assumes a twisted nematic liquid crystal arrangement that extends between the first substrate and the second substrate at a twist angle less than 90 degrees.

11. The method of claim 9, further comprising the step of incorporating the liquid crystal cell into a liquid crystal display.

12. The method of claim 9, wherein the step of adjusting the position of the particle source relative to the first substrate comprises at least one of: adjusting the position of the particle source, adjusting the position of the first substrate, and adjusting the position of a mask that is positioned between the particle source and the substrate.

13. The method of claim 9, wherein the mask is spaced a distance from the substrate, and wherein the positioning of the mask is done after exposing the at least a first region of the first the substrate to the particle beam.

* * * * *